(12) United States Patent
Langlais

(10) Patent No.: US 12,194,928 B2
(45) Date of Patent: Jan. 14, 2025

(54) ROOF ARRANGEMENT, ROOF MODULE, AND MOTOR VEHICLE HAVING A SEALING ARRANGEMENT

(71) Applicant: Webasto SE, Stockdorf (DE)

(72) Inventor: Cédric Langlais, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 338 days.

(21) Appl. No.: 17/830,798

(22) Filed: Jun. 2, 2022

(65) Prior Publication Data

US 2022/0410816 A1    Dec. 29, 2022

(30) Foreign Application Priority Data

Jun. 14, 2021    (DE) ..................... 10 2021 115 338.7

(51) Int. Cl.
| | | |
|---|---|---|
| *B60R 11/04* | (2006.01) | |
| *B60J 10/00* | (2016.01) | |
| *B60R 11/00* | (2006.01) | |
| *B62D 25/06* | (2006.01) | |

(52) U.S. Cl.
CPC ............. *B60R 11/04* (2013.01); *B60J 10/00* (2013.01); *B62D 25/06* (2013.01); *B60R 2011/004* (2013.01); *B60R 2011/0082* (2013.01)

(58) Field of Classification Search
CPC ....................................................... B60J 10/00
USPC ....................................................... 296/210
See application file for complete search history.

(56) References Cited

U.S. PATENT DOCUMENTS

| | | | | |
|---|---|---|---|---|
| 4,514,068 | A * | 4/1985 | Urquhart ................ | F16M 11/08 352/132 |
| 5,887,939 | A * | 3/1999 | Yamaguchi ............ | B62D 65/04 296/210 |
| 8,305,443 | B2 * | 11/2012 | Buschmann ............ | B60R 11/04 348/148 |
| 9,834,154 | B2 * | 12/2017 | Carson .................... | G03B 17/04 |
| 10,011,230 | B1 * | 7/2018 | Brown ................. | H04N 23/698 |
| 11,760,274 | B2 * | 9/2023 | Higashimachi ......... | B60R 11/04 248/237 |
| 11,951,913 | B2 * | 4/2024 | Huelsen .................. | B60R 11/00 |

(Continued)

FOREIGN PATENT DOCUMENTS

DE    10351363 A1 * 6/2005 ............... B60R 1/00

*Primary Examiner* — Amy R Weisberg
*Assistant Examiner* — Veronica M Shull
(74) *Attorney, Agent, or Firm* — Fitch, Even, Tabin & Flannery, LLP

(57) ABSTRACT

A roof module for forming a motor vehicle roof, the roof module having a panel component whose outer surface at least partially forms the roof skin of the vehicle roof, and an opening in which at least one environment sensor is disposed, the environment sensor being configured to send and/or receive electromagnetic signals for detecting the vehicle environment. The at least one environment sensor is displaceable between a retracted position and a deployed position. A weather strip is disposed circumferentially at the opening, and the at least one environment sensor may have a cover which is in contact with the weather strip when the at least one environment sensor is in the retracted position to seal the opening, and a contact surface which is in contact with the weather strip when the at least one environment sensor is in the deployed position to seal the opening.

14 Claims, 2 Drawing Sheets

(56) References Cited

U.S. PATENT DOCUMENTS

| | | | |
|---|---|---|---|
| 2012/0242833 A1* | 9/2012 | Yamaguchi | B60R 11/04 348/148 |
| 2013/0016219 A1* | 1/2013 | Hahner | B60R 11/04 348/148 |
| 2020/0086833 A1 | 3/2020 | Frederick et al. | |
| 2021/0364631 A1* | 11/2021 | Hasegawa | G01S 13/86 |

* cited by examiner

ROOF ARRANGEMENT, ROOF MODULE, AND MOTOR VEHICLE HAVING A SEALING ARRANGEMENT

CROSS-REFERENCE TO RELATED APPLICATION

This application claims priority from German Patent Application Number DE 10 2021 115 338.7, filed Jun. 14, 2021, which is hereby incorporated herein by reference in its entirety for all purposes.

FIELD

The invention relates to a roof module according to the preamble of claim 1 and to a motor vehicle having such a roof module.

BACKGROUND

Roof modules of this kind are widely used in vehicle manufacturing. For example, roof modules are prefabricated as separate functional modules and are connected to a roof frame structure (which is part of the body structure) at the assembly line. The roof module at least partially forms a roof skin of the vehicle roof at its outer surface, the roof skin preventing humidity or air flows from entering the vehicle interior. The roof skin is formed by one or more panel components, which can be made of a stable material, such as painted metal or painted or dyed-through plastic. The roof module can be a part of a rigid vehicle roof or a part of an openable roof subassembly.

Furthermore, the development in vehicle manufacturing is increasingly focusing on autonomously or semi-autonomously driving motor vehicles. In order to enable the vehicle controller to control the motor vehicle autonomously or semi-autonomously, a plurality of von environment sensors (e.g., lidar sensors, radar sensors, (multi-)cameras, etc. including other (electrical) components) are employed, which are integrated in the roof module, for example, and which detect the environment surrounding the motor vehicle and determine, for example, a current traffic situation from the detected environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by suitable signal evaluation and to be used for controlling the vehicle. In order to protect the environment sensors from harmful environmental conditions, such as humidity and air flows, the environment sensors are typically installed in one or more housings, which define a dry area of the roof module, which is sealed against humidity.

If the environment sensor is supposed to be capable of being retracted and deployed so as to, for example, satisfy aesthetic aspects and additionally protect the environment sensor from environmental conditions in an inactive state, there is the problem that humidity has to be prevented from entering the roof module (and the roof space of the vehicle) and especially the dry area of the roof module in order to ensure the proper function of the environment sensor (or a plurality of environment sensors). This often requires complex sealing, which is difficult to install and maintain.

SUMMARY

Hence, the object of the invention is to propose a roof module which reduces the problems of the known state of the art that are described above and which in particular enables simple sealing of the roof module.

This object is attained by a roof module according to the teaching of claim 1.

Advantageous embodiments of the invention are the subject matter of the dependent claims.

The roof module according to the invention for forming a vehicle roof on a motor vehicle comprises a panel component whose outer surface at least partially forms the roof skin of the vehicle roof, and an opening in which at least one environment sensor is disposed, the environment sensor being configured to send and/or receive electromagnetic signals for detecting the vehicle environment. The roof module is characterized in that the at least one environment sensor is displaceable between a retracted position and a deployed position, that a weather strip is disposed circumferentially at the opening, and that the at least one environment sensor comprises a cover which is in preferably liquid-tight contact with the weather strip when the at least one environment sensor is in the retracted position so as to seal the opening, and a contact surface which is in preferably liquid-tight contact with the weather strip when the at least one environment sensor is in the deployed position so as to seal the opening.

Rain water, for example, or another kind of humidity (liquid) has to be prevented from entering the opening of the roof module in particular when the environment sensor is retracted or deployed since this humidity might otherwise cause damage to the roof module and other components. The opening can be safely sealed by the arrangement of the cover and the contact surface according to the invention both in the retracted position and in the deployed position of the environment sensor since the cover is in contact with the weather strip (in the retracted position) or the contact surface is in contact with the same weather strip (in the deployed position), which means that liquid is prevented from entering the roof module (e.g., a dry area in which the environment sensor is disposed) or the roof space of the vehicle. One advantage of the arrangement according to the invention is that only one weather strip is needed for sealing the opening in a liquid-tight manner both in the retracted state and in the deployed state. Thus, the sealing of the opening can be kept compact in terms of components and only a small number of individual components are needed, which simplifies mounting. The weather strip is preferably disposed in an edge area of the opening and can be plugged onto the edge of the opening, for example. The weather strip is preferably in one piece. If it is of an uninterrupted design (i.e., if the weather strip is closed), no humidity can enter through a gap, which means that a circumferential sealing around the opening is possible. Both the cover and the other contact surface are preferably disposed on a housing of the environment sensor or even form part of said housing. Thus, it is possible to provide respective mating sealing contact surfaces for the weather strip by means of the cover's coming into contact therewith in the retracted state of the environment sensor on the one hand and by means of the contact surface's coming into contact therewith in the deployed state of the environment sensor on the other hand. "At least one environment sensor" means that the roof module can comprise one or more than one environment sensor.

The roof module according to the invention can form a structural unit in which features for autonomous or semi-autonomous driving assisted by driver assistance systems are integrated and which can be placed on top of a vehicle body shell as a unit by the vehicle manufacturer. Furthermore, the roof module according to the invention can be a purely fixed roof or a roof including a roof opening system. Moreover, the roof module can be configured for use in a passenger car or in a utility vehicle. The roof module can preferably be provided as a structural unit in the form of a roof sensor module (RSM) in which the environment sensors are provided so as to be inserted into a roof frame of a vehicle body as a suppliable structural unit.

The environment sensor of the sensor module of the roof module according to the invention can basically be configured in various ways and can in particular comprise a lidar sensor, a radar sensor, an optical sensor, such as a camera, and/or the like. For example, lidar sensors operate in a wavelength range of 905 nm or approximately 1550 nm. The material of the roof skin in a see-through area of the environment sensor should be transparent to the wavelength range used by the environment sensor and should therefore be selected as a function of the wavelength(s) used by the environment sensor.

In a preferred embodiment, the cover is disposed on the environment sensor in such a manner that it is spaced apart from the contact surface. This has the advantage that the opening (or a construction-related or function-related gap between the opening and the environment sensor) can be sealed by means of only one (single) weather strip both in the retracted and in the deployed position of the environment sensor. The cover and the contact surface are preferably spaced apart from each other on a housing of the environment sensor. The cover is preferably a lid part of the environment sensor by means of which the opening is closed in a preferably flush manner in relation to the roof skin when the environment sensor is in the retracted state. The contact surface is disposed on the housing in such a manner that it is spaced apart from said cover, which is disposed on an upper side of the housing (viewed in the roof direction).

In a preferred embodiment, the weather strip comprises a tubular gasket which is disposed in an edge area of the opening and which is preferably in one piece. Tubular gaskets are weather strips which are known in automobile technology and which are characterized in particular by simple mounting and which can be plugged onto an edge area of the opening, for example. Such a tubular gasket is preferably of a one-piece design, i.e., continuous (in one piece), which means it has no gap through which humidity can enter an interior of the opening. For example, such a tubular gasket can also be glued to an edge area or connected thereto in another manner at said edge area of the opening.

In a preferred embodiment, the cover and the contact surface are essentially congruent in terms of area. This embodiment serves in particular to point out that the cover and the contact surface are components having essentially the same area so that the opening can thus be sealed relative to the environment sensor both in the retracted position of the environment sensor and in the deployed position of the environment sensor. The equality of the areas of the cover and the contact surface exists in the longitudinal direction and the transverse direction of these components in particular in a sectional view. In this context, the phrasing "essentially congruent in terms of area" means that the area of a cross section of the cover almost identically corresponds to the area of a cross section of the contact surface and only deviates slightly by ±10%, for example. This enables sealing in both positions of the environment sensor using only the one weather strip.

In a preferred embodiment, the cover is a continuous surface portion which is disposed on an upper side of the environment sensor and which is essentially flush with the outer surface of the panel component when the environment sensor is in the retracted position. So the cover preferably forms a lid part of a housing of the environment sensor, said lid part being disposed on or attached to an upper side of the housing. For example, the cover can be formed by a metal portion which visually forms a structural unit with the roof skin surrounding the opening, i.e., the panel component, when the environment sensor is in the retracted state.

In a preferred embodiment, the contact surface is a continuous surface portion which is disposed on an underside of the environment sensor. The underside of the environment sensor or of the housing of the environment sensor is preferably located opposite the upper side of the environment sensor or of the housing of the environment sensor. In this embodiment, the contact surface is preferably disposed symmetrically (inclined by an angle, if applicable) to the cover on the underside of the environment sensor as a continuous panel component and closes the housing at an underside of the housing, for example.

In a preferred embodiment, the contact surface is a profile portion which is disposed around the environment sensor. Alternatively to the design of the contact surface as a continuous surface portion, it is also possible for the contact surface to be formed by a profile or a profile portion which is disposed, for example, at an outer circumference of the housing of the environment sensor and which protrudes over the housing (or juts out from the housing). In this embodiment, the contact surface, including a dimensioning of the housing, forms a continuous surface (the mating sealing surface) in a longitudinal direction and a width direction, when viewed in the cross section, said continuous surface being preferably essentially congruent with the area of the cover. Thus, the opening can also be sealed by means of the cover and by means of a profile portion spaced apart therefrom and provided on the housing of the environment sensor both when the environment sensor is in the retracted position and when the environment sensor is in the deployed position.

In a preferred embodiment, the environment sensor can be rotated between the retracted position and the deployed position about an axis of rotation. So, in this configuration, the environment sensor can, for example, be displaced from the retracted position into the deployed position by a (pure) rotation about the axis of rotation, an actuator (e.g., an electric motor) preferably interacting with the environment sensor for this purpose.

In a preferred embodiment, the cover is inclined relative to the contact surface by an angle which essentially corresponds to a rotation angle of the environment sensor about the axis of rotation during the displacement from the retracted position into the deployed position. In this context, "essentially" means that the angle about which the contact surface is inclined relative to the cover deviates from the rotation angle of the environment sensor about the axis of rotation by preferably no more than ±10%. So, in this configuration, the contact surface is not disposed parallel to the cover on the environment sensor but inclined relative thereto by an angle. This inclination of the contact surface relative to the cover makes it possible for the environment sensor to be sealed by means of only one weather strip both in the retracted position and in the deployed position even though the environment sensor rotates about the axis of rotation by a predetermined angle.

In a preferred embodiment, the environment sensor can be moved between the retracted position and the deployed position along a motion axis (i.e., translationally) and/or rotated between the retracted position and the deployed position about an axis of rotation. So the environment sensor can also be moved from the retracted position into the deployed position by means of another motion sequence than a pure rotation. For instance, it is also possible for the environment sensor to me moved along a motion axis (i.e., translationally). Likewise, it is possible for the environment sensor to execute both a rotatory movement and a linear movement to move from the retracted position into the deployed position (and vice-versa).

In a preferred embodiment, a distance between the cover and the contact surface on the environment sensor essentially corresponds to a distance about which the environment sensor is moved between the retracted position and the deployed position along the motion axis (i.e., translationally). In this context, "essentially" means that the distance by which the contact surface is spaced apart from the cover deviates from the distance by which the environment sensor is moved along the motion axis (i.e., translationally) by preferably no more than ±10%. If the environment sensor moves from the retracted position into the deployed position linearly (up and down) along a motion axis only, the cover and the contact surface are preferably aligned parallel to each other but spaced apart from each other by the displacement lift of the environment sensor between the positions along the motion axis. In the case of a more complex movement of the environment sensor (e.g., a mixed movement composed of a rotation and a linear movement), the cover and the contact surface can be disposed on the environment sensor or its housing both at a predetermined distance (which essentially corresponds to a distance of the linear movement) and at an angle (which essentially corresponds to the rotation angle of the rotary movement).

Basically any type of environment sensor can be installed in the roof module. The cooling provided in the roof module according to the invention is particularly advantageous when lidar sensors and/or radar sensors and/or camera sensors and/or multi-camera sensors are used.

It is understood that the embodiments and illustrative configurations mentioned above and yet to be discussed can be realized not only individually but also in any combination with each other without departing from the scope of the present invention. Moreover, all embodiments and illustrative configurations of the roof module in their entirety relate to a motor vehicle having such a roof module.

An embodiment of the invention is schematically illustrated in the drawing and will be discussed as an example below.

BRIEF DESCRIPTIONS OF THE DRAWINGS

DETAILED DESCRIPTION

Figure 1:
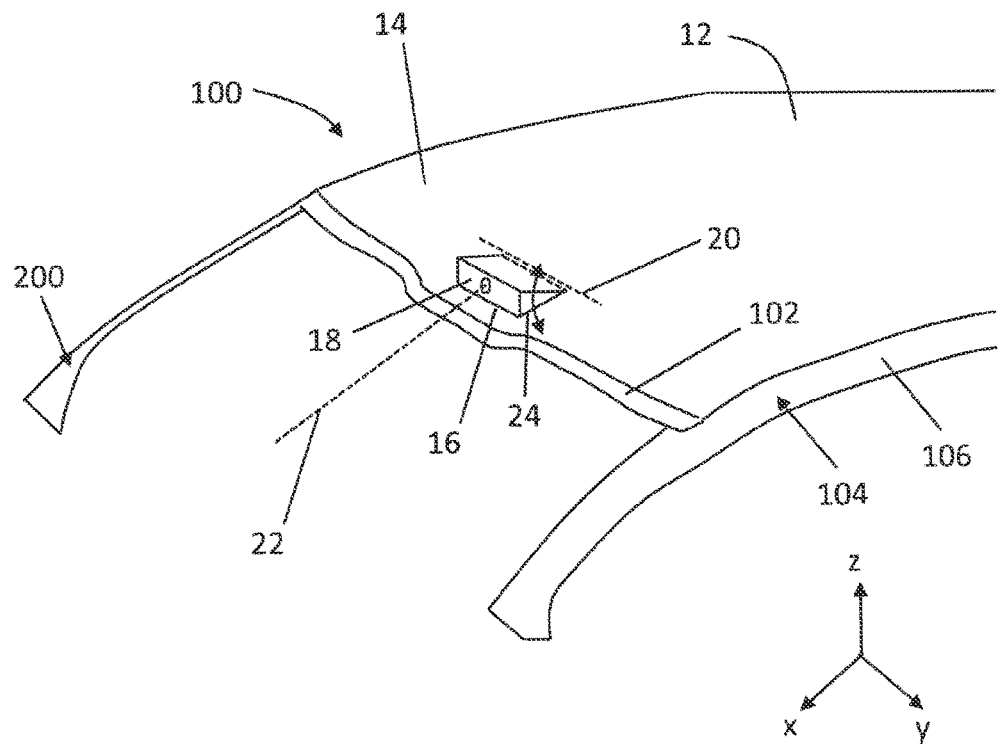
FIG. 1 is a perspective view of a vehicle roof having a roof module according to the invention.

FIG. 1 shows a vehicle roof 100, which comprises a roof module 10. Roof module 10 comprises a panel component 12 for forming roof skin 14 of vehicle roof 100 of a motor vehicle (not shown in full). An opening 16, in which an environment sensor 18 is disposed, is located in a center roof portion at the front of vehicle roof 100 and roof module 10, viewed in a longitudinal vehicle direction x. Opening 16 and environment sensor 18 are disposed centrally (in vehicle width direction y) directly behind a front transverse beam 102, which defines a header at the roof of the vehicle.

Roof module 10 is inserted into a roof frame 104 of a vehicle body 200 as a structural unit and has a frame structure 103 itself, which serves to mount roof module 10 on roof frame 104. Roof frame 104 is formed by at least two of transverse beams 102 (front and rear) and by at least two longitudinal beams 106, which extend in longitudinal vehicle direction x. In other illustrative configurations, roof module 10 can also be a panoramic roof having a see-through opening for the passenger compartment, for example.

Figure 2:
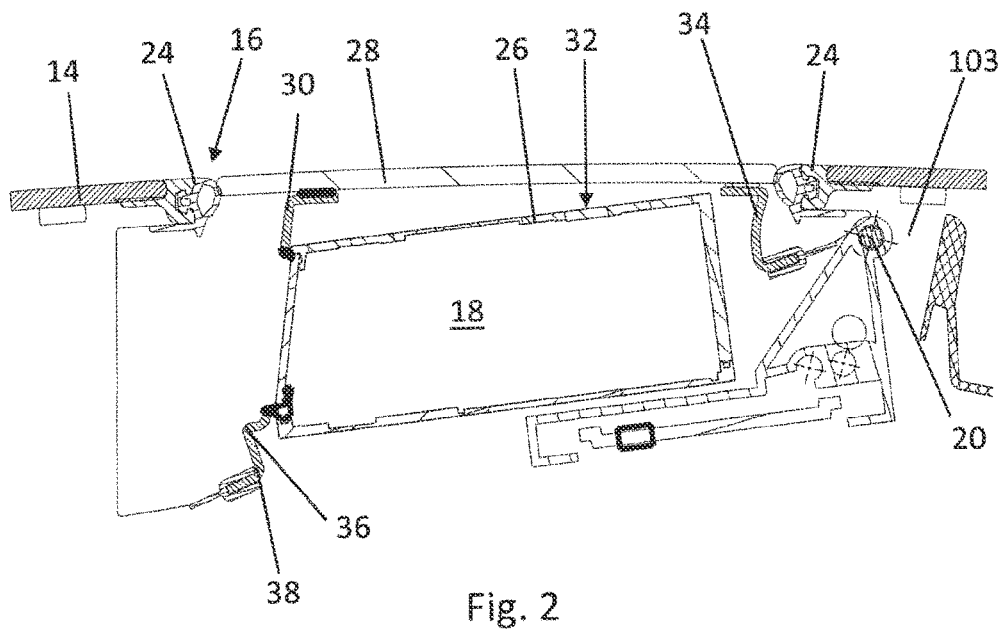
FIG. 2 shows a first illustrative configuration of a sensor module with an environment sensor in a retracted state.
Figure 3:
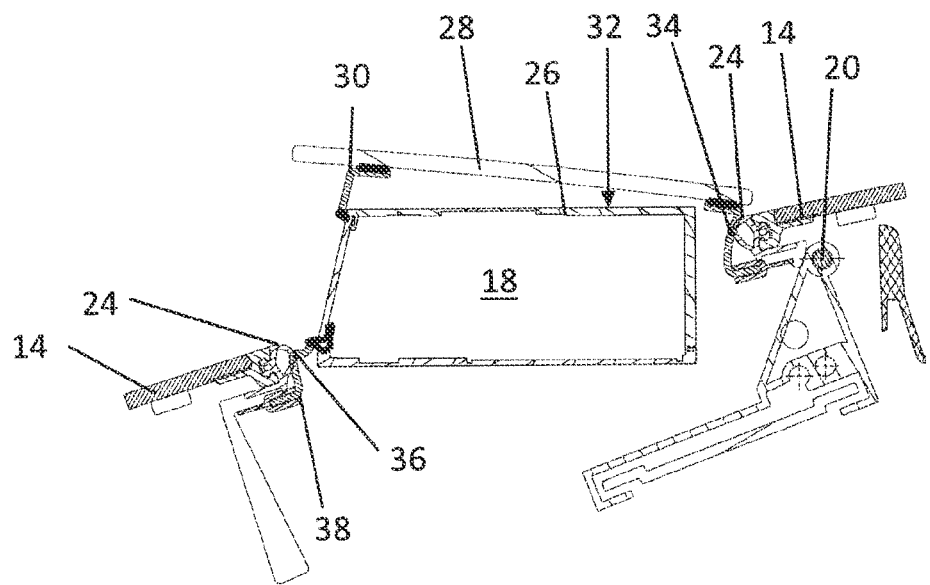
FIG. 3 shows the first illustrative configuration of a sensor module with the environment sensor in a deployed state.

Environment sensor 18 (e.g., a lidar sensor) can be displaced or rotated between a retracted position and a deployed position about an axis of rotation 20 of the environment sensor, for example (see FIGS. 2 and 3). In FIG. 1, environment sensor 18 is illustrated in the deployed position. The displaceability of environment sensor 18 from the retracted position into the deployed position and vice-versa is preferably provided by means of an electric drive (not shown). In other embodiments, environment sensor 18 can be displaced from the retracted position into the deployed position by a purely linear movement, for example. A combination of a rotary movement and a linear movement is possible, as well.

Environment sensor 18 is configured to detect a vehicle environment surrounding the vehicle by means of, for example, an evaluation and control unit using electromagnetic signals. To this end, environment sensor 18 is configured to send and/or receive in a field of view of environment sensor 18, which extends conically about an optical axis 22 of environment sensor 18.

In order to prevent (rain) water from entering opening 16, which might cause damage to environment sensor 18 and/or other electrical components and the interior of the vehicle, roof module 10 has a weather strip 24, which is a tubular gasket in the case at hand. Weather strip 24 is in one piece and disposed in, e.g., plugged onto, an edge area of opening 16. Weather strip 24 surrounds opening 16 along its outer circumference (which is visible merely in the sectional view in FIGS. 2 and 3). Weather strip 24 forms a primary seal, by means of which humidity is prevented from entering opening 16 both in the retracted state and in the deployed state. Furthermore, secondary seals can be provided; however, they will not be discussed here in more detail.

In the case at hand, environment sensor 18 comprises a housing 26, within which environment sensor 18 is disposed. Housing 26 forms a dry area, within which environment sensor 18 is protected against humidity. A cover 28 is disposed on housing 26, cover 28 being fixed to housing 26 via a first profile portion 30, which is mounted on an upper side 32 of housing 26, in the case at hand. Cover 28 is further connected to roof frame structure 103 in a rotatable manner via a second profile portion 34, enabling environment sensor 18 to rotate from the retracted position into the deployed position about axis of rotation 20. Cover 28 forms a lid portion of housing 26, said lid portion being a continuous surface portion and being flush with roof skin 14 when environment sensor 18 is in the retracted state (see FIG. 2).

Furthermore, environment sensor 18 comprises a contact surface 36, which is a third profile portion 38 in the case at hand, which is disposed around environment sensor 18. In the case at hand, third profile portion 38 is disposed on a lower lateral portion of housing 26. Cover 28 is disposed on environment sensor 18 or its housing 26 in such a manner that it is spaced apart from contact surface 36. Cover 28 and contact surface 36 are essentially congruent in terms of area.

Cover 28 serves to seal opening 16 when environment sensor 18 is in the retracted position by coming into liquid-tight contact with weather strip 24. Contact surface 36 serves to seal opening 16 when environment sensor 18 is in the deployed position by coming into liquid-tight contact with weather strip 24.

Cover 28 is disposed on the lateral portion of housing 26 in such a manner that it is inclined relative to contact surface 36 by an angle. The angle of inclination essentially corresponds to a rotation angle of environment sensor 18 about axis of rotation 20 during the displacement from the retracted position into the deployed position (see rotation angle between FIGS. 2 and 3).

The invention claimed is:

1. A roof module for forming a vehicle roof on a motor vehicle, the roof module comprising:
   a panel component whose outer surface at least partially forms the roof skin of the vehicle roof, and
   an opening in which at least one environment sensor is disposed, the environment sensor being configured to send and/or receive electromagnetic signals for detecting the vehicle environment,
   wherein the at least one environment sensor is displaceable between a retracted position and a deployed position,
   a weather strip is disposed circumferentially at the opening, and
   the at least one environment sensor comprises a cover which is in contact with the weather strip when the at least one environment sensor is in the retracted position to seal the opening, and
   a contact surface which is in contact with the weather strip when the at least one environment sensor is in the deployed position to seal the opening.

2. The roof module according to claim 1, wherein the cover is disposed on the at least one environment sensor in such a manner that it is spaced apart from the contact surface.

3. The roof module according to claim 1, wherein the weather strip comprises a tubular gasket which is disposed in an edge area of the opening.

4. The roof module according to claim 1, wherein the cover and the contact surface are essentially congruent in terms of area.

5. The roof module according to claim 1, wherein the cover is a continuous surface portion which is disposed on an upper side of the at least one environment sensor and which is essentially flush with the outer surface of the panel component when the at least one environment sensor is in the retracted position.

6. A roof module for forming a vehicle roof on a motor vehicle, the roof module comprising:
   a panel component whose outer surface at least partially forms the roof skin of the vehicle roof, and
   an opening in which at least one environment sensor is disposed, the environment sensor being configured to send and/or receive electromagnetic signals for detecting the vehicle environment,
   wherein the at least one environment sensor is displaceable between a retracted position and a deployed position,
   a weather strip is disposed circumferentially at the opening, and
   the at least one environment sensor comprises a cover which is in contact with the weather strip when the at least one environment sensor is in the retracted position to seal the opening, and
   a contact surface which is in contact with the weather strip when the at least one environment sensor is in the deployed position to seal the opening,
   wherein the contact surface is a continuous surface portion which is disposed on an underside of the at least one environment sensor.

7. The roof module according to claim 1, wherein the contact surface is a profile portion which is disposed around the at least one environment sensor.

8. A roof module for forming a vehicle roof on a motor vehicle, the roof module comprising:
   a panel component whose outer surface at least partially forms the roof skin of the vehicle roof, and
   an opening in which at least one environment sensor is disposed, the environment sensor being configured to send and/or receive electromagnetic signals for detecting the vehicle environment,
   wherein the at least one environment sensor is displaceable between a retracted position and a deployed position,
   a weather strip is disposed circumferentially at the opening, and
   the at least one environment sensor comprises a cover which is in contact with the weather strip when the at least one environment sensor is in the retracted position to seal the opening, and
   a contact surface which is in contact with the weather strip when the at least one environment sensor is in the deployed position to seal the opening,
   wherein the at least one environment sensor is configured to rotate between the retracted position and the deployed position about an axis of rotation.

9. The roof module according to claim 8, wherein the cover is inclined relative to the contact surface by an angle which essentially corresponds to a rotation angle of the at least one environment sensor about the axis of rotation during the displacement from the retracted position into the deployed position.

10. The roof module according to claim 1, wherein the at least one environment sensor is configured to be moved between the retracted position and the deployed position along a motion axis and/or to be rotated between the retracted position and the deployed position about an axis of rotation.

11. The roof module according to claim 10, wherein a distance between the cover and the contact surface on the at least one environment sensor essentially corresponds to a distance by which the at least one environment sensor is moved between the retracted position and the deployed position along the motion axis.

12. The roof module according to claim 1, wherein the at least one environment sensor is at least one of a lidar sensor, radar sensor, camera sensor, and a multi-camera sensor.

13. A motor vehicle comprising a roof module according to claim 1.

14. The roof module according to claim 3, wherein the tubular gasket is in one piece.

* * * * *